Aug. 26, 1969     P. J. OWSEN     3,463,048

VIBRATION DAMPING DEVICE FOR MILLING CUTTERS

Filed Aug. 17, 1967

INVENTOR.
PAUL J. OWSEN
BY

Morse, Altman & Oates

ATTORNEYS

United States Patent Office 3,463,048
Patented Aug. 26, 1969

---

3,463,048
VIBRATION DAMPING DEVICE FOR MILLING CUTTERS
Paul J. Owsen, Wayne, Mich., assignor to Lovejoy Tool Company, Inc., Springfield, Vt., a corporation of Vermont
Filed Aug. 17, 1967, Ser. No. 661,403
Int. Cl. B23c 9/00
U.S. Cl. 90—11    2 Claims

ABSTRACT OF THE DISCLOSURE

The tapered shank of a face mill arbor is covered with a layer of rubberized cloth or fiber glass cloth which has been impregnated with a high-heat resistant plastic to damp the vibrations of the mill when in operation. Other surfaces of the arbor which are engaged by surfaces of the face mill or the back of the mill body may be covered with impregnated cloth.

---

This invention relates to means for reducing or eliminating the transmission of vibrations of the cutters on a face mill to the spindle in which the mill arbor is mounted. Under certain conditions of operation vibrations in the mill are apt to result from the engagement of the cutters with the work piece. If transmitted to the arbor on which the face mill is mounted, such vibrations are apt in time to injure the bearings in which rotates the spindle in which the arbor is mounted. In addition to possible damage to spindle bearings, the vibration and chatter can have a very detrimental effect on the finish appearance of the work piece and, also, on a decrease in the tool life of the cutter blade edges resulting in more frequent sharpening.

To damp out such vibrations, I cover the tapered portion of the arbor with rubberized cloth or fiber glass cloth impregnated with a high-heat resistant plastic which is compressed between the surfaces of the tapered portion of the arbor and the interior tapered surface of the spindle into which the arbor is drawn. Similar cloth may also be applied to other surfaces of the arbor or to the back of the cutter body.

Figure 1:
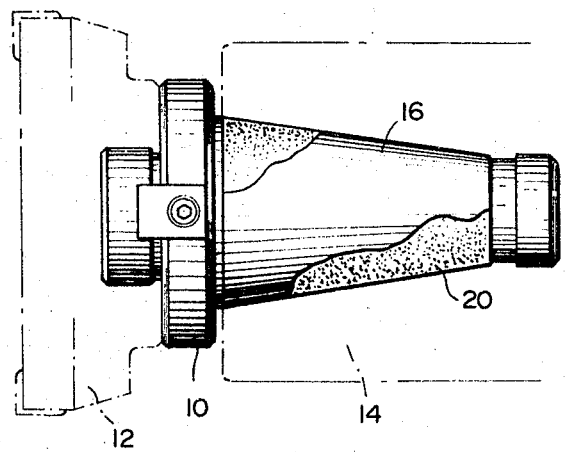
Figure 2:
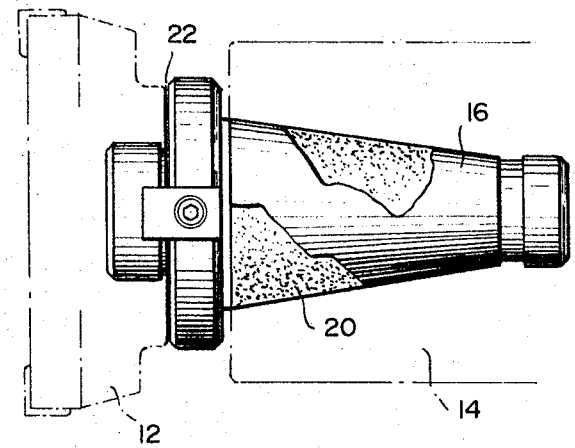
Figure 3:
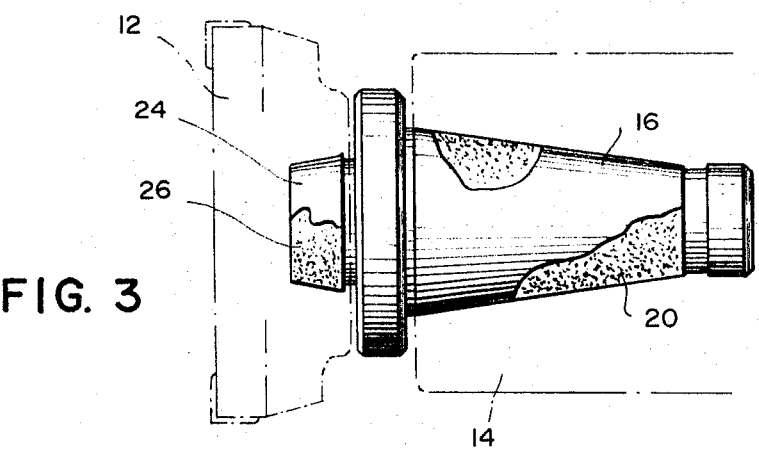

For a more complete understanding of the invention, reference may be had to the following description thereof and to the drawing, of which FIGURE 1 is an elevational view of an arbor having its tapered portion covered with impregnated cloth;

FIGURE 2 is a similar view of an arbor having the tapered portion and an end face so covered; and FIGURE 3 is a similar view of a slightly different form of arbor having two tapered portions covered with impregnated cloth.

An arbor 10 of conventional form is shown in FIGURE 1, a face mill 12 secured to the arbor, and a portion of a spindle 14 in which the arbor is secured, being lightly indicated by broken lines. The tapered portion 16 of the arbor which fits in a complementary hollow in the spindle 14 is covered with a layer of impregnated cloth 20. For convenience, a piece of such cloth may be cut to shape and cemented on the tapering surface to cover it. On the drawing portions of the cloth are broken away to show the arbor itself.

For this purpose a rubberized cloth having a thickness of 0.017" is used, the cloth being embedded in the rubber which covers both faces. When the arbor is drawn into the spindle, the rubberized cloth 20 is strongly compressed by the wedging action of the taper. As the rubber is only slightly compressible, it is found that such compression reduces the thickness of the cloth by approximately only 0.002". The cloth layer between the arbor and the spindle largely absorbs the vibrations of the cutters which would otherwise be transmitted to the spindle and its bearings.

More complete damping of the cutter vibrations can be had by the additional provision of a layer 22 of impregnated cloth between an end face of the arbor and the face of the mill 12 which is pressed against it when the mill is secured to the arbor 10, as indicated in FIGURE 2.

Some arbors have in addition to the tapered portion 16 which is received by the spindle 14 a second tapered portion 24 which is short and which fits into a corresponding recess in the face mill mounted thereon. This second tapered portion 24 may also be covered with rubberized cloth 26 as indicated in FIGURE 3. With arbors of other shapes, similar rubberized cloth can be used to advantage between the surfaces of the several parts which ordinarily are in mutual engagement when the parts are assembled.

I claim:

1. A metal arbor for a face mill, said arbor having a tapered portion adapted to fit in a complementary hollow in a spindle and to support a face mill at the larger end of the tapered portion, and a layer of cloth impregnated with a high-heat resistant plastic covering the surface of said tapered portion, said impregnated cloth having an uncompressed thickness of about 0.017".

2. An arbor as claimed in claim 1, said arbor having an end face normally engaged by surface of a face mill, said end face having a layer of said impregnated cloth cemented thereon.

References Cited

UNITED STATES PATENTS

| 2,525,646 | 10/1950 | Burg | 279—1 |
| 2,819,032 | 1/1958 | Detrie et al. | 248—358 |
| 2,879,069 | 3/1959 | Swanson. | |
| 3,292,237 | 3/1966 | Fisher | 144—218 |

ANDREW R. JUHASZ, Primary Examiner

G. WEIDENFELD, Assistant Examiner

U.S. Cl. X.R.

279—1